United States Patent [19]

Ewanus

[11] 4,351,064

[45] Sep. 21, 1982

[54] COMMUNICATION

[75] Inventor: Walter Ewanus, Ellicott City, Md.

[73] Assignee: Westinghouse Electric Corp., Pittsburgh, Pa.

[21] Appl. No.: 328,213

[22] Filed: Jan. 31, 1973

Related U.S. Application Data

[63] Continuation-in-part of Ser. No. 86,999, Oct. 30, 1970, which is a continuation of Ser. No. 754,375, Aug. 21, 1968, abandoned.

[51] Int. Cl.³ .......................... H04B 1/10; H04K 1/00

[52] U.S. Cl. .......................................... 455/29; 455/26; 375/1

[58] Field of Search ....................... 325/32, 34, 42, 65, 325/163, 145, 143, 44, 47, 323, 344, 349, 474; 455/26-29; 375/1

[56] References Cited

U.S. PATENT DOCUMENTS

| | | | |
|---|---|---|---|
| 3,305,636 | 2/1967 | Webb | 325/47 |
| 3,350,644 | 10/1967 | McNair | 325/65 |
| 3,351,859 | 11/1967 | Groth, Jr. et al. | 325/65 |
| 3,432,619 | 3/1969 | Blasbalg | 325/22 |
| 3,475,558 | 10/1969 | Cahn | 179/15 BA |
| 3,706,933 | 12/1972 | Bidell et al. | 325/42 |

*Primary Examiner*—Howard A. Birmiel
*Attorney, Agent, or Firm*—R. M. Trepp

[57] ABSTRACT

There is disclosed frequency modulation (FM) or phase modulation (PM) communication with a receiver having a limiter, in spread-spectrum operation for security purposes. The spectrum is spread on transmission by superimposing a psuedo-noise code modulation on the intelligence modulation of the carrier. On reception the spectrum is collapsed by auto-correlation of the pseudo-noise code. The pseudo-noise spectrum is produced by a digital coder which causes phase modulation of the carrier at the transmitter and the spectrum is collapsed by an identical coder which remodulates the received signal at the receiver which is operated in precise synchronism with the coder at the transmitter. To maintain synchronism a reference oscillator signal which periodically varies the phase of the received carrier is injected into the coder network at the receiver; this reference oscillator signal is processsed so that it passes through the limiter of the receiver. The modulated carrier from the transmitter is received in parallel paths. In one path the received carrier is modulated directly by the code from the coder at the receiver; in the other path, the received carrier is modulated by the code from the coder, periodically delayed in synchronism with a reference oscillator. The resulting so modulated carriers are correlated and the sum of the independently correlated carriers is impressed on the receiver as a carrier which is modulated by the intelligence and in addition is phase modulated in synchronism with the reference oscillator. The phase modulation is not suppressed by the limiter of the receiver and operates through a phase detector, low pass filter and voltage controlled oscillator, which are elements of a tracking loop, to maintain the coder at the receiver in synchronism with the received coder. The spread-spectrum operation disclosed lends itself to embodiment in adapters for converting conventional clear-signal communication equipment constructed in the past to spread-spectrum operation.

6 Claims, 4 Drawing Figures

COMMUNICATION

REFERENCE TO RELATED APPLICATIONS

This application is a continuation-in-part of application Ser. No. 86,999, filed Oct. 30, 1970, (herein called parent application) which is itself a continuation of application Ser. No. 754,375 filed Aug. 21, 1968 and now abandoned.

BACKGROUND OF THE INVENTION

This invention relates to communications and has particular relationship to communications which for security and electronic counter-measure purposes has the capability of spread-spectrum operation. Such communications is disclosed in the parent application. In transmission, a carrier is modulated in accordance with the intelligence being communicated and in addition is phase-shift-key modulated (o or $\pi$ radians; that is by phase reversals) with a digital pseudo-noise (PN) code. Typically, as shown in the parent application, the code may be provided by a code generator in the form of a shift register comprised of a number of flip-flops feedback coupled through an exclusive OR. The number of bits in the code is determined by the number, N, of flip-flops and is $2^N-1$. The frequency of the clock which clocks these number of bits will then determine the code repetition period. Typically, there may be 51 stages in the code generator and for this number of bits the period is about 17 years for a clock frequency of 5 mhz. The effect of the modulation with the code is to spread and transform the spectrum of the intelligence-modulated carrier. The envelope of the spread-frequency spectrum then has the form $$\left(\frac{\sin \chi}{\chi}\right)^2.$$

The narrow frequency band of this spread spectrum containing the intelligence is not detectable even by receivers having positive signal-to-noise ratios which are not equipped with auto-correlation apparatus.

To derive the intelligence on reception, the PN code is auto-correlated with a replica code. The received carrier modulated by the intelligence plus a PN code, is phase-shift-key modulated by a PN code which is substantially the same as, and is maintained in synchronism with, the PN code of the transmitter. To maintain the synchronism, a periodic tracking reference oscillator or dither is impressed on the received carrier which is being auto-correlated. In accordance with the teachings of the parent application this dither is an amplitude modulation derived from the reference oscillator which is converted to a phase modulation. This phase modulation passes through the receiver network and its phase is compared with the phase of the signal from the reference oscillator to derive a signal for compensation or regulation of the PN coder of the auto-correlator via a tracking loop.

The invention of the parent application is applicable to RF output of different types; amplitude, angle phase, or frequency modulated or others. However, heretofore it has not been possible to apply the teaching of the parent application to communications equipment in which the receiver network includes a limiter which removes amplitude modulations.

It is an object of this invention to overcome the disability of the parent application and to provide communications having the facility for spread spectrum operation notwithstanding that the receiving units may or may not include limiters through which the correlated, intelligence-modulated carrier passes. It is another object of this invention to provide an adapter for converting conventional communications equipment, particularly of the frequency modulation or phase modulation type, in which the receiver may or may not have a limiter, to spread-spectrum operation. It should be pointed out that the receiver limiter does not preclude full operation of the technique.

SUMMARY OF THE INVENTION

In accordance with this invention, the tracking reference oscillator signal which, is impressed on the auto-correlated carrier at the receiver unit is a periodic phase modulation. Such a phase modulation is passed by the receiver network and is readily processed to produce an error signal for maintaining the PN coder of the receiver in synchronism with the received code via a tracking loop.

The auto-correlation network includes a PN coder which cooperates with parallel channels or branches in both of which the received spread-spectrum signal consisting of the carrier, modulated by the intelligence and the transmitter PN code, is received and auto-correlated. In one channel the received signal is directly phase-shift-key (PSK) modulated by the code from the PN coder. In the other channel the signal is also PSK modulated by the code from the coder, but in this case, the PN code is processed to include, as a periodic time modulation, the tracking signal, derived from a reference oscillator, and in addition, the carrier of the auto-correlated signal derived from this channel has impressed thereon a phase-shift, typically 90° with respect to the auto-correlated carrier derived from the directly PSK modulated channel. The auto-correlated signals from the two channels are combined in a summer or adder. This process causes the received and auto-correlated carrier to be phase modulated in synchronism with the reference oscillator at the receiver unit; the phase modulation property, however, contains tracking information. The resulting signal derived from the adder has impressed thereon a periodic phase-modulation which is passed by the limiter of the receiver network and appears as a periodic signal of the frequency at the output of the receiver detector. The periodic signal is compared with the output of the reference oscillator in a phase detector and a signal for correcting departure of the PN coder at the receiver from synchronization is derived as an error signal which controls a tracking loop.

The time-modulation of the PN code is called a dither and its frequency is controlled by the reference oscillator. The dither may be square-wave or sinusoidal. For purposes of illustration the sinusoidal dither is adopted in this application as typical. The reference oscillator should have a frequency out of the intelligence bandwidth to prevent interference. To set the amplitude of the dither several conflicting demands are compromised. It is desirable that this amplitude be as high as practicable but not so high as to swing the control circuit for the PN coder out of the narrow region where the control can be effectuated, this being the correlation interval. In addition the dither absorbs energy from the transmitted signal which reduces the energy in the intelligence modulation. The dither amplitude should not be so high as to raise difficulties in the understanding of the received intelligence. Typically, the dither amplitude should be a fraction, for example, 10%, of the clock-bit period or the correlation interval.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DETAILED DESCRIPTION OF INVENTION

Figure 1:
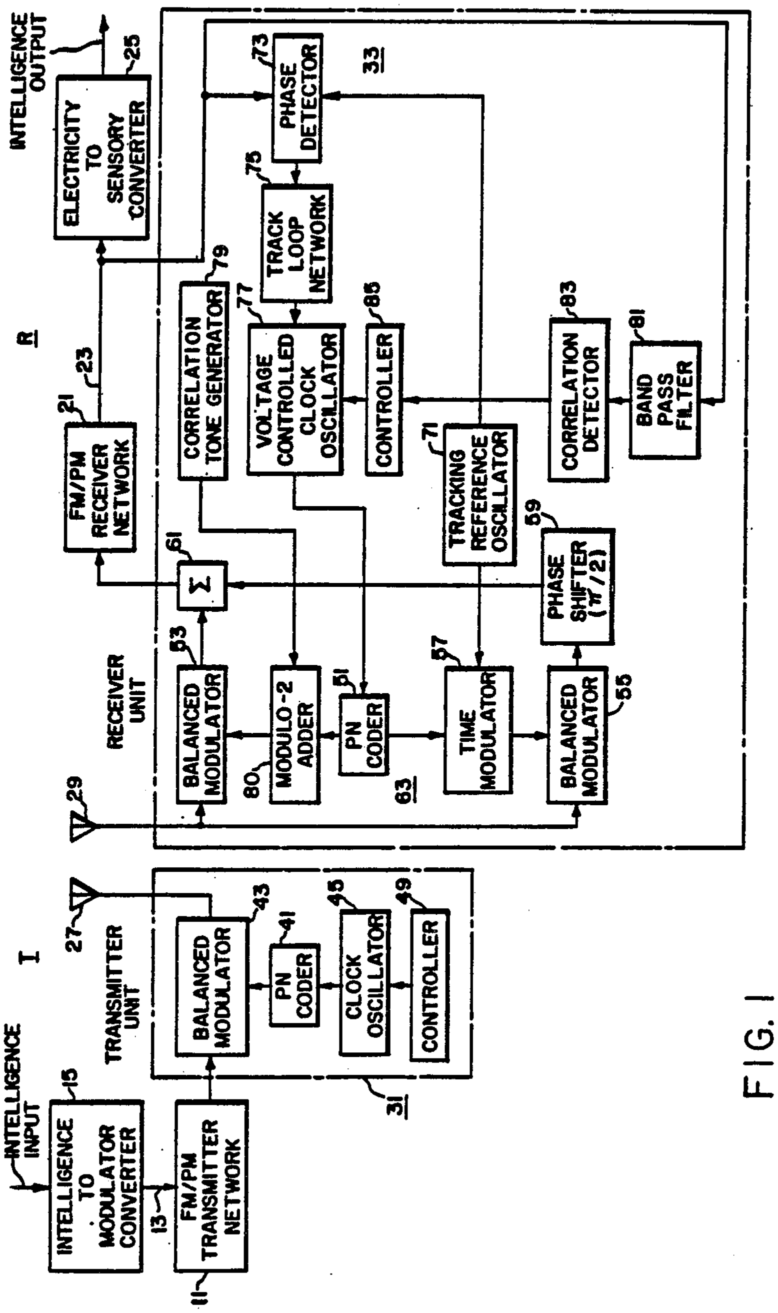
FIG. 1 is a block diagram showing an embodiment of this invention.

The apparatus shown in FIG. 1 is a communication system including communicating units T and R. In practice such a system usually has facilities for two-way communications and each unit, T and R, includes a transceiver module (see 21, 21' FIG. 9, parent application), which are conditioned to operate as transmitter or receiver as circumstances may demand. To facilitate the understanding of this invention the unit T of FIG. 1 is shown as a transmitter unit and the unit R of FIG. 1 is shown as a receiver unit.

The transmitter unit T includes a frequency or phase modulation transmitter network 11. The network 11 produces a carrier which is modulated by the intelligence to be transmitted, the modulation being supplied to its input 13 from conventional intelligence-to-modulation converter 15.

The receiver unit R includes a frequency or phase modulation receiver 21 which includes facilities for demodulating the carrier; the demodulated signal being supplied at its output 23 to an electricity-to-sensory converter 25, for example, a loud-speaker or television viewer. The communication channel between the units T and R is through antennas 27 and 29 which are usually constructed and connected both for transmission and reception.

It is assumed that the units T and R are conventional communication units converted to spread-spectrum operation by the inclusion of adapters 31 and 33. Usually, where the communication is two-way, both adapters are like the adapter 33 at the receiver unit R except proper control switching is provided to switch the configuration to that of adapter 31. However, separate adapters for transmission and reception may be provided and to facilitate the explanation the adapter 31 is shown only as a transmitter adapter and the adapter 33 as a receiver adapter.

The adapter 31 at the transmitter unit T includes a PN coder 41 which is connected to a balanced modulator 43, as disclosed in the parent application, interposed between the transmitter network 11 and the antenna 27. The PN coder 41 is driven by a clock oscillator 45. The clock oscillator 45 produces pulses each of which enables the coder 41 to produce a pulse. The coder pulses are digital in form such that the digital states (ones and zeroes) are random-like, simulating a noise-like signal. The pulse pattern is repetitive because of the predictable digital sequence that is generated by this class of pseudo-noise coder but the repetition period may be very long; about 17 years for 51 element coder with a 5 mhz. clock. The pulses from the coder 41, by operation of the balanced modulator 43, phase modulate the signal from the transmitter network 11 superimposing on the carrier, modulated by the intelligence a code modulation which is alternately zero and $\pi$ radians spreading the spectrum transmitted by the antenna 27 and giving the signal transmitted by the antenna the quality of a noise-like modulation.

Figure 2:
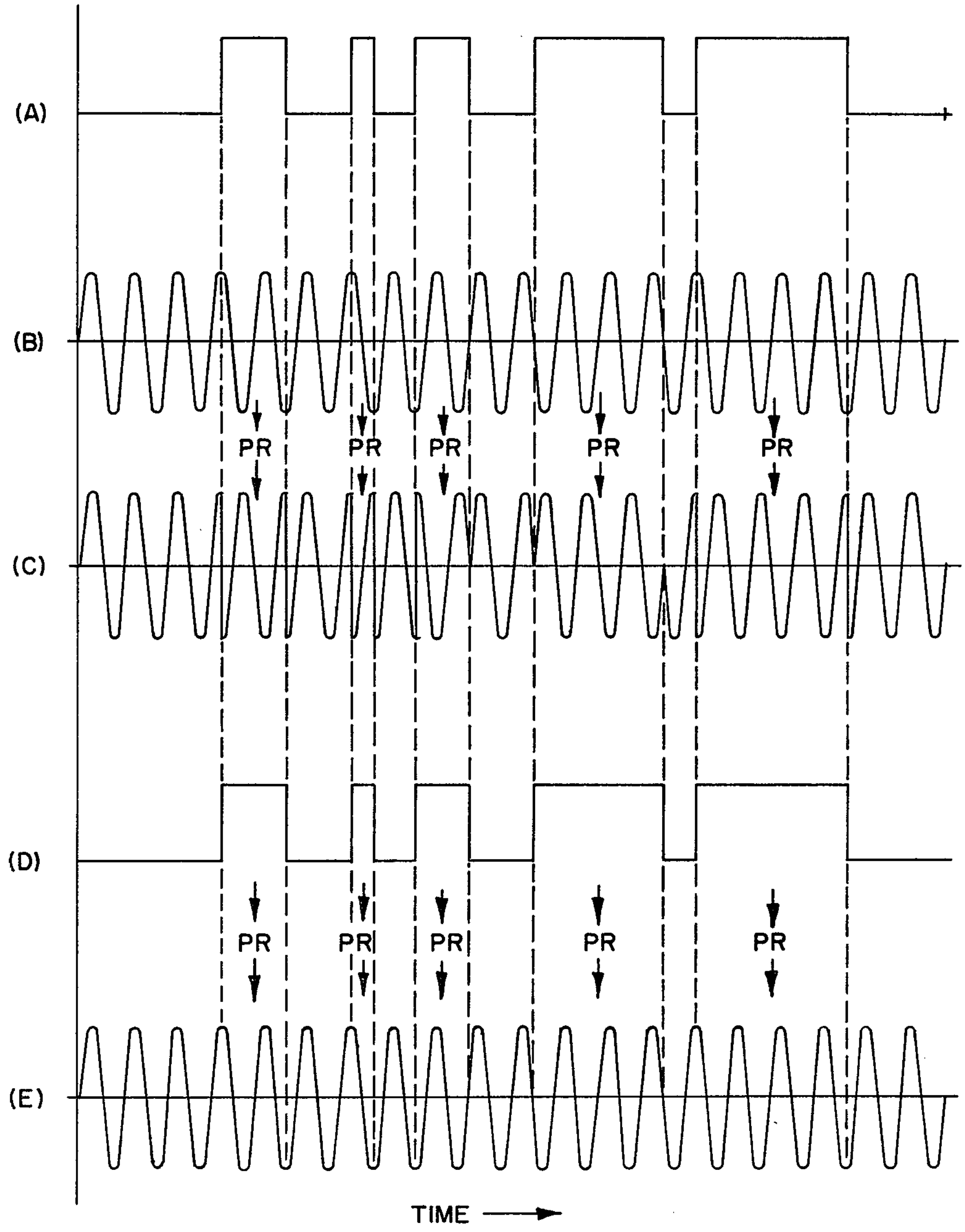
FIGS. 2A, B, C, D, E, are graphs illustrating the RF and digital time-waveform operation of the apparatus shown in FIG. 1 and particularly the synchronous or correlated condition of the coders at the transmitter and the receiver.

The modulation of the PN code is illustrated in FIGS. 2A, B, C. In these graphs amplitude of the represented signals is plotted vertically and time horizontally. Points along the time axes of FIGS. 2A–E which are at the intersections of the time axes with any vertical line represent the same instant of time. The PN pulses are represented in FIG. 2A as alternately positive and negative for different durations dependent on the ones and zeroes state of the PN coders. FIG. 2B shows the signal derived from the transmitter network 11 (omitting the intelligence modulation for clarity). It is assumed that the response of the balanced modulator 43 is to reverse the phase of the signals from network 11 when the pulses from the PN coder 41 are positive and to preserve the phase when these pulses are negative. The resulting modulation is illustrated in FIG. 2C. The phase of the waves 51 are reversed as indicated by the labelling PR between FIGS. 2B and 2C.

The adapter 31 also includes a controller 49. Where the adapters 31 and 33 are alike the controller 49 also serves the purpose of setting the adapter 31 for reception when the demand arises.

The adapter 33 includes, in addition to the PN coder 51 and components of the tracking loop to be described below, balanced modulators 53 and 55, time modulator 57, phase-shifter 59, modulo-2 adder 80 and signal adder or summer 61. The PN coder 51 is connected directly to the modulo-2 adder 80 to balanced modulator 53 and through the time modulator 57 to the balanced modulator 55. Typically, the time modulator 57 may be a controllable analog or digital time delay network. The time modulator 57 retards or advances the pulses which pass from the PN coder 51 to the balanced modulator 55 as referenced to the other coder output for intervals which depend on the setting of the time modulator and controlled in rate by the reference oscillator 71. The balanced modulators 53 and 55 are connected to be supplied in parallel from the receiver antenna 29. The phase-shifter 59 may be a quadrature hybrid. In shifts the phase of the signal transmitted by the balanced modulator 55 by 90 degrees typically. The phase shift may be different than 90 degrees.

The network 63 including the coder 51, the PN modulators 53 and 55, the time modulator 57, the phase shifter 59 modulo-2 adder 80 and signal adder 61 is an auto-correlation network. It has parallel auto-correlation channels or branches; one including the balanced modulator 53 and the output of the other including the balanced modulator 55 with phase shifter 59, both branches then being summed by the signal adder 61. The network 63 is interposed between the antenna 29 and the FM/PM receiver network 21. It functions to auto-correlate the signal received by the antenna 29 and to provide a tracking means to maintain coder synchronism. The error signal is derived from the output of the receiver, signal line 23.

The operation of the balanced modulators 53 and 55 is illustrated in FIGS. 2D and 2E. In FIG. 2D the code produced by the PN coder 51 is plotted as a function of time. The coder 51 and the modulator 53 or 55 act on the received signal represented in FIG. 2C. The operation of the modulators 53 and 55 is the same as the operation of modulator 43. When the pulses from coder 51 are positive the phase is reversed and when the pulses are negative the phase is preserved. The effect of the modulators 53 and 55 is then to reconvert the signal represented in FIG. 2C to its original form as shown in FIG. 2E.

The received carrier modulated by the intelligence and pseudo-noise is demodulated as regards the pseudo-noise. The signal which results is the carrier modulated by the FM or PM intelligence but with the pseudo-noise modulation removed. The above-described represents correlation; that is, a form of code demodulation takes place both in the channel 53–61 and in the parallel channel 55–59–61. However, as shown in FIGS. 2A and D this requires that the codes produced by coder 41 and 51 should be alike and in precise synchronism. To maintain synchronism a tracking signal is superimposed on the signal processed in the auto-correlation network 63.

A time modulation or time dither is superimposed in the parallel channel in the signal from the PN coder 51. The adapter 33 includes a reference oscillator 71 which provides the dither. The dither may have a square or sine wave form. The dither frequency is out of the intelligence bandwidth so that it does not confuse the received intelligence. The reference oscillator 71 controls the time modulator 57 which impresses a periodically varying time delay or time dither on the pseudo-noise from the PN coder 51 of the frequency of the oscillator 71. The signal from the PN coder 51 with the dither superimposed thereon is impressed in the balanced modulator 55. The amplitude of this dither, which is a time variation, is typically a fraction of the bit period of the clock oscillator 45, say 10%, peak-to-peak. This dither process causes the signal derived from the balanced modulator 55 to be amplitude modulated in synchronism with the reference oscillator 71; the amplitude modulation is the signal from which a code tracking signal is derived.

Figure 3:
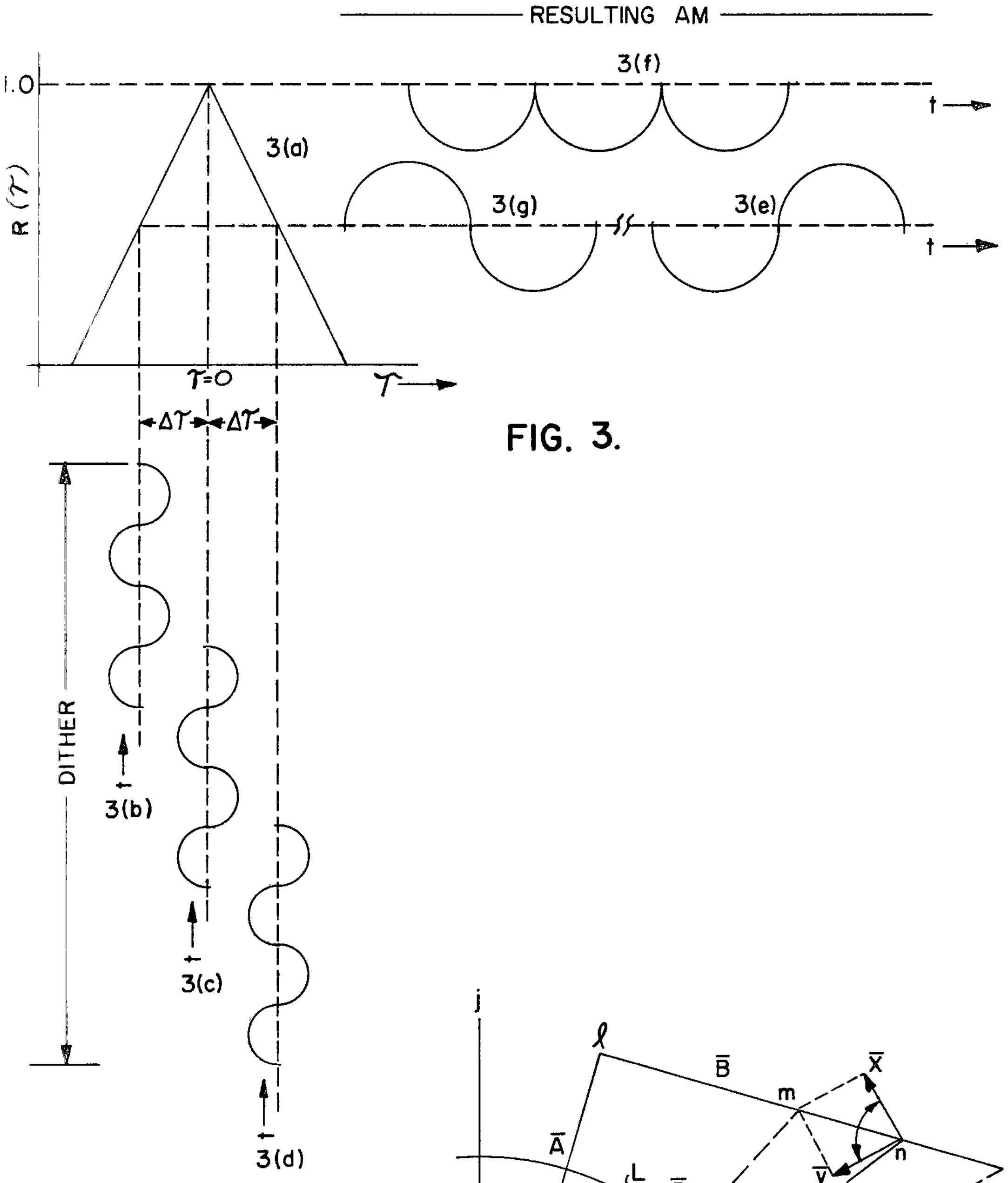
FIGS. 3*a, b, c, d, e, f, g,* are graphs illustrating the manner in which the tracking reference oscillator signal is impressed on one of the auto-correlation channels which generates the tracking information.

How this amplitude modulation process creates a tracking signal is illustrated in FIGS. 3(*a*) through (*g*). In considering these graphs it should be realized that the cross correlation property of two similar PN codes, one from coder 41 in the transmitter unit and the other from coder 51 in the receiver unit is the function R(τ) or the cross-correlation integral.

$$R(\tau)\frac{1}{T}\int_{O}^{T} f(t)f(t-\tau)d\tau$$

The integration process is in effect the result of sweeping the received code over the output of the local coder over a total period T of the code. Where the received and local pseudo-noise pulse outputs are of digital waveform, the function R (τ) is of the characteristic triangular form.

FIG. 3(*a*) shows this function. R(τ) is plotted vertically and τ horizontally. FIGS. 3(*b*), (*c*), and (*d*) represent the dither amplitude; amplitude being plotted horizontally and time vertically. FIGS. 3(*e*), (*f*), (*g*), represent the resulting modulation produced by the time dither; amplitude is plotted vertically and time horizontally.

Where the received pulses, which originated from PN coder 41, and the pulses from PN coder 51 are perfectly correlated; that is when τ, which represents the relative displacement of the pulses, is 0, the correlation function is as shown in FIG. 3*a*, at its full value (R(τ)=1), and when the error or displacement is plus or minus one clock bit period from τ=0, R(τ)=0 as shown. With a sinusoidal dither imparted to the receiver PN coder, three possible boundary conditions are illustrated in FIGS. 3(*a*) through (*f*). Condition 1: The sequence produced by the PN coder 51 of the receiver is ahead in time of the received PN sequence and is sinusoidally time modulated as shown in FIG. 3(*b*). The resulting carrier is then amplitude modulated in synchronism with the dither and is in a specific phase reference as shown in FIG. 3(*e*). Condition 2: The sequence of PN coder 51 is in time synchronism with the received PN sequence (FIG. 3*c*) and is likewise modulated. The resulting amplitude modulation appears as though the signal is fullwave rectified (double frequency) of the reference oscillator and contains no fundamental frequency component of the reference oscillator. Hence, zero error signal signifies zero tracking error (FIG. 3*f*). Condition 3: The sequence of PN coder 51 is retarded with respect to the received PN sequence and also time modulated (FIG. 3*d*). The resulting AM is similar to Condition 1 but with the phase reversed. (FIG. 3*g*) Other Conditions: As the time position error varies between the limits shown above, conditions partially like those of conditions 1 and 3 and condition 2 can be derived. The amount of fundamental frequency voltage that is available will then be linearly proportional to the time position error and have phase relationship dependent on the position being advanced or retarded in time (τ).

There are now two channels which have a correlated carrier one of which, 55–59, has an amplitude modulation that is an amplitude and phase function of a local reference oscillator 71. It is now necessary to establish a quadrature relationship between the two channels and this is accomplished by phase shifter 59. Although either channel 53 or 57–55 can be phase shifted, the amplitude modulated channel 57–55 is shown phase shifted by the phase shifter 59. The outputs of the two channels is summed by the adder 61.

Figure 4:
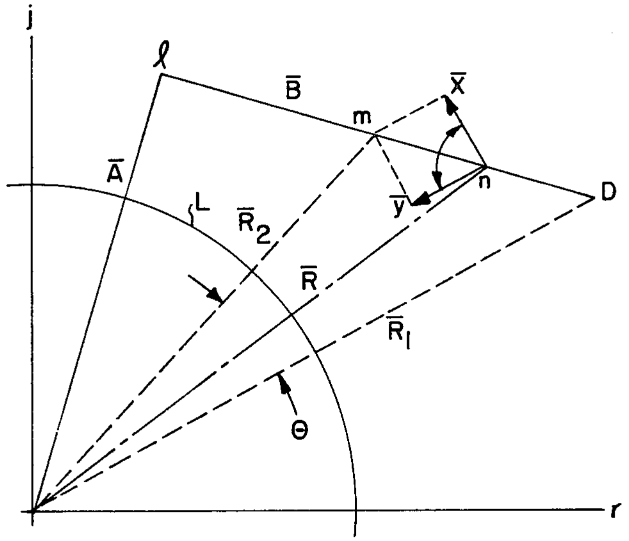
FIG. 4 is a vector diagram showing the manner in which the auto-correlation channels of the auto-correlation network at the receiver unit convert the amplitude modulation of the carrier in one of the auto-correlation channels into a periodic phase modulation of the carrier.

FIG. 4 is a vector diagram showing the effect of summing the quadrature vectors in the parallel channels 53–61 and 55–59–61. The vectors are plotted with reference to real axis r and imaginary axis j at right angles to each other. The vector $\overline{A}$ represents the correlated carrier component derived from channel 53–61 and $\overline{B}$ the quadrature carrier component derived from channel 55–59–61. Vectors $\overline{X}$ and $\overline{Y}$ are the components of the dither modulation which cause the amplitude variation of the carrier component $\overline{B}$. The resultant of these components $\overline{X}$ and $\overline{Y}$ vary the magnitude of vector $\overline{B}$ in synchronism with the oscillations of the reference oscillator 71. While these oscillations are impressed on the balanced modulator 55 as time variations, they are manifested as magnitude variations because the actual effect of these time variations is to shift the pulses generated by PN code 51 relative to the received pulses thus producing variations in R($\tau$) (FIG. *3a*). The range of time variations is limited so that it is well within the triangle TR of FIG. *3a*, say $\Delta\tau$ on each side of $\tau=0$. The sum of vectors $\overline{X}$ and $\overline{Y}$ as the reference oscillator swings through each period may be regarded as oscillating about point n and between point m and point o. The peak-to-peak modulation is equal to about one-half of vector $\overline{B}$ as shown and is represented by segment mno of vector $\overline{B}$. The sum of vector $\overline{A}$ and modulated vector $\overline{B}$ gives the resultant vector R with extremities of modulation shown as vectors $\overline{R}_1$ and $R_2$. The phase modulation angle ($\theta$) is then the result of the amplitude modulated vector $\overline{B}$ summed with vector $\overline{A}$. A phase modulation $\theta$ detectable by a receiver network 21 having a limiter is thus produced.

The adapter 33 includes as part of the tracking loop a phase detector 73 which produces an error voltage signal dependent on the degree of time displacement $\Delta\tau$ of the coders and have a polarity (plus or minus) dependent upon the phase between oscillations of reference oscillator 71 and the oscillations derived from the receiver network 21. The limiter in the receiver network 21 suppresses the variations in magnitudes of the vector $\overline{R}$ ($\overline{R}_1$, $\overline{R}_2$). The effect of the limiter is represented by the arc L in FIG. 4. The resultant phase modulation (shown peak to peak as $\theta$) is the only component of the reference oscillator that is useful in deriving the tracking error signal. The error output of the phase detector 73 is impressed through a track-loop network 75 on a voltage-controlled clock oscillator 77 which resets the PN coder 51 so that it is in exact synchronism with the received pseudo-noise pulses. The tracking loop including the correlation network 63, receiver 21, line 23, phase detector 73, track loop network 75, and reference oscillator 71 maintains the synchronism of the receiver coder 51 with that of the received code.

Where the signal transmitted by the transmitter unit is FM, the discriminator of receiver network 21 detects the derivative of the phase modulation so that if the modulation is A sin $\omega$t, the detected component is B cos $\omega$t. Where the receiver network 21 is of the phase detector type, the output signal is B sin $\omega$t for input A sin $\omega$t. Since quadrature components are desired for coherent demodulation, a tracking error signal may be derived for the FM case by coherently detecting the output signal using the local reference oscillator 71 as the coherent reference. PN detection requires an additional phase shift to provide the necessary quadrature relationship for coherent demodulation. The output of the phase detector 73 (coherent demodulator) with proper filtering, G($\omega$), provides the familiar "S" curve that is familiar in the art of servo-mechanisms. It is this output that controls the voltage-controlled clock oscillator 77 that clocks the local PN coder 51 and maintains synchronism with the received PN sequence.

It should be noted that the resultant narrow phase deviation of the carrier does not provide a large signal-to-noise ratio at the output of the first detector of the receiver 21 but in practice the track-loop network 75 is inherently narrowband (several Hz typically). The signal-to-noise enhancement is more than adequate to compensate for the narrow deviation. In fact, the intelligence signal can normally deteriorate below acceptable user levels before the track loop signal becomes too noisy to be usable.

The adapter 33 includes a correlation tone generator 79 which is connected to the modulo $-2$ adder 80. The coder 51 is also connected to the adder 80 and the output of the adder 80 is connected to the balanced modulator 53. The tone produced by generator 79 is transmitted through the loop of the receiver network 21 likewise as a phase modulation when the local PN coder 51 is in precise time synchronism with the received sequence. The tone derived from generator 79 passes from the output 23 of the receiver network 21 through a band pass filter 81, constructed to pass the tone generated by generator 79, a correlation detector 83 and a controller 85 and is impressed on the voltage-controlled oscillator 77 to provide means to establish initial code synchronization by a time search process.

Where the communication is two-way the controller 85 operates like the controller 49 to set the unit R for transmitting or receiving. Also, the controller 85 provides means for establishing initial code synchronism, also called code acquisition. Typically, this object may be accomplished by constructing the controller and instrumenting it so that it sends a signal to the voltage controlled clock oscillator 77 to cause the coder to operate in a search mode. In this search mode the phase of the coder 51 is advanced and retarded by increasing or decreasing the clock oscillator 77 frequency to search out all possible code positions until correlation is achieved. This form of initial code synchronization is described only in the interest of concreteness. Other methods of code acquisition or code synchronization such as "short code," matched filter, or stable clock acquisition are also applicable.

The apparatus is specifically shown and described with the adapters 31 and 33 in an RF interface, i.e., between the antenna and the transmitter and receiver networks 11 and 21 respectively. This is feasible for high RF powers and with low loss. Indeed, it has been shown that equipment 60 watts PEP of RF power can be handled with less than 1.0 db of loss. Thus, by following the teachings of this invention, the capabilities of existing radio equipments can be extended with no internal modifications to have broadband, spread-spectrum operation. It is only necessary to have access to the antenna RF terminals and the receiver output terminal. As a result it is now feasible to consider spread-spectrum communications as an economical add-on to the hundreds of thousands of FM transceivers that are in state and local government inventories (particularly those of the Department of Defense and Law Enforcement agencies).

The adapter 33 can also be constructed and connected to operate into the IF portion of the receiver network, that is, with an IF interface. The RF amplifier or the system must then have sufficient bandwidth to support the spectrum spreading both in the transmission and the reception.

Typically, the apparatus according to this invention may be constructed to operate at UHF carrier frequencies of between 225 and 400 mega-Hertz; it may also be constructed to operate in the L-band at about 1000 megaHertz and at intermediate frequencies of about 70 mega-Hertz. Typically, the PN coder bit may have a duration of one-fifth microsecond; the spread-spectrum bandwidth is then about 10 mega-Hertz. For audio transmissions the intelligence bandwidth is about 15 kilo-Hertz for FM equipments and the dither frequency 15 or 16 kilo-Hertz.

While preferred embodiments of this invention have been disclosed, many modifications thereof are feasible. This invention is not to be restricted except insofar as is necessitated by the spirit of the prior art.

What we claim is:

1. Communication apparatus for communicating intelligence including a transmitter unit having (a) a transmitter network for producing a carrier,
(b) input means, connected to said network, for modulating said carrier with an input signal containing intelligence to be communicated, and
(c) modulator means, connected to said network, for impressing on said carrier a pseudo-noise code,
(d) a receiver unit having a receiver network for receiving the output of said transmitter including said intelligence and conditioning said output to be converted into intelligence perceptable form said receiver network being of the type including means for demodulating a modulated carrier, the said demodulating means including a limiter;
(e) an auto-correlation network including a first correlation branch conducting the modulated carrier and a second correlation branch conducting the modulated carrier;
(f) means connected to said correlation network, for dephasing the output of one of said branches with respect to the output of the other of said branches to produce a signal, dependant on the sum of the outputs of said branches, capable of being passed by said limiter;
(g) means connected to said first and second branches for impressing said sum-dependent signal on said receiver network, and
(h) means, connected to said receiver network and to said correlation network, for impressing on said sum-dependant signal a tracking signal manifested by a variation of the phase of the sum-dependant signal impressed on said receiver network and capable of being passed by said limiter said tracking signal cooperating with said sum-dependant signal to actuate said auto-correlation network to auto-correlate said code; and communication means between said transmitter network and said receiver network.

2. The apparatus of claim 1 wherein the means for impressing a tracking signal includes a reference oscillator and means, connected to said oscillator, for time-modulating at least one of the carriers passing through at least one of the correlation branches in dependence upon the output of said oscillator; the said means for impressing a tracking signal also including means comparing the phase relationship of the sum of the outputs of the branches with respect to said oscillator output to produce a parameter dependent on the phase displacement of said last-named outputs with respect to said oscillator output to derive the tracking signal, and means responsive to said tracking signal for maintaining the correlation network in synchronism with the psuedo-noise-code-impressing modulator means.

3. A pseudo-noise adapter for the receiver unit of a communication system for communicating intelligence and having a transmitter unit producing a carrier to be modulated, the said receiver unit having a receiver network for receiving the output of said transmitter including said intelligence and conditioning said output to be converted into intelligence-perceptable form having a limiter, the said transmitter unit including a first pseudo-noise coder, a first modulator connected in carrier-modulating relationship with said coder, and first timing means for actuating said coder periodically; the said adapter including a second pseudo-noise coder and modulator means connected in a network with said second coder, the said last-named network to be connected to said receiver network with said second coder correlation-modulating said carrier, to supply its output to said receiver network, and second timing means for actuating said second coder periodically, said second coder when so actuated producing a code substantially the same as the code produced by said first coder, the said adapter also including means, connected to said network including said modulator means, for producing a tracking signal capable of being passed, retaining its phase and deviation properties, by the limiter of said receiver network and detector means for deriving from the tracking signal after it is passed by said receiver network, a signal measuring the departure of said second coder from synchronism with said first coder, and the said adapter including means, connected to said second timing means, responsive to said departure-measuring signal, for reducing the departure of said second coder from synchronism with said first coder.

4. The method of deriving the intelligence communicated by the transmitter unit of a communications system transmitting a carrier modulated by said intelligence and also by pseudo-noise modulation with receiving unit including a receiver network having a limiter, a pseudo-noise coder and modulator means connected to said coder; the said method comprising (a) correlating the transmitted pseudo-noise code by cooperation of said coder and said modulator means to produce a first signal including a carrier modulated by said intelligence;
(b) impressing a periodic delay on the output of said pseudo-noise coder, said delay having a frequency outside of the frequency bandwidth of the communicated intelligence;
(c) correlating the delayed output of said pseudo-noise coder by cooperation of said output and said modulator means to produce a second signal including a carrier modulated by said intelligence;
(d) dephasing said first and second signals relative to each other;
(e) adding said dephased first and second signals to derive a composite signal including a carrier modulated by said intelligence and also having a phase modulation dependent on the periodicity of said delay;
(f) impressing said composite signal in the input of said receiver to derive, at the output of said receiver, said communicated intelligence and also a signal of the periodicity of said delay displaced in phase with reference to the impressed periodic delay;
(g) deriving an error signal dependent on the displacement in phase of said signal of the periodicity of said delay; and
(h) controlling the pseudo-noise coder in accordance with said error signal to maintain said coder in synchronism with the pseudo-noise modulation modulating said transmitted carrier.

5. A pseudo-noise adapter for the receiver unit of a communication system having a transmitter unit producing a carrier to be modulated, the said receiver unit having a receiver network having a limiter, the said transmitter unit including a first pseudo-noise coder, a first modulator connected in carrier-modulating relationship with said first coder, and first timing means for actuating said coder periodically; the said adapter including a second pseudo-noise coder and modulator means including second and third modulators connected in parallel in a network with said second coder, the said last-named network to be connected to said receiver network, with said second coder correlation-modulating said carrier, and second timing means for actuating said second coder periodically, said second coder when so actuated producing a code substantially the same as the code provided by said first coder, said second timing means including a time modulator interposed between the second coder and the third modulator, for passing the output of the second coder to the third modulator delayed by intervals set by the time modulator, said last-named network also including means for shifting the phase of the outputs of said second and third modulators with respect to each other and means for summing the dephased outputs of said second and third modulators; the said adapter also including means, connected to said network including said modulator means, for producing a tracking signal capable of being passed, retaining its phase and deviation properties, by the limiter of said receiver network and detector means for deriving from the tracking signal, after it is passed by said receiver network, a signal measuring the departure of said second coder from synchronism with said first coder, the tracking-signal-producing means including a reference oscillator and also including means, connecting said oscillator to said time modulator, to set the delaying intervals of said time modulator in accordance with the oscillations of said oscillator, said tracking-signal-producing means also including means, connecting said reference oscillator to said detector means in comparison relationship with the output of the receiver network, to produce the departure-measuring signal and the said adapter including means, connected to said second timing means, responsive to said departure-measuring signal, for reducing the departure of said second coder from synchronism with said first coder.

6. The adapter of claim 5 wherein the detector means is a phase detector which determines the phase and deviation relationship between the output of the reference oscillator and the tracking signal output of the receiver network and the departure-measuring signal is dependent on the said phase and deviation relationship.

* * * * *